ARTHUR C. DAMAN
INVENTOR.

BY
ATTORNEY

ARTHUR C. DAMAN
INVENTOR.

Patented Aug. 15, 1950

2,518,451

UNITED STATES PATENT OFFICE 2,518,451

JIGGING APPARATUS FOR SEPARATING DIVIDED SOLIDS

Arthur C. Daman, Denver, Colo., assignor to Mining Process and Patent Company, Denver, Colo., a corporation of Delaware Application May 12, 1945, Serial No. 593,427

1 Claim. (Cl. 209—423)

This invention relates to jigging apparatus, and more particularly to jigging apparatus for separating divided solids in accordance with the specific gravity of the constituents thereof. This invention also relates to a circuit which includes a vibratory jig and auxiliary apparatus.

Jigging apparatus is particularly useful where one constituent of the ore or the like differs relatively greatly in specific gravity from another constituent.

The most successful previous jigging apparatus depends upon the pulsating movement of a water column moved upwardly and downwardly, as by a diaphragm pump, so as to produce a relative vibratory or pulsating movement of divided solids fed along a screening or separatory element. The screening element comprises a bed of shot or the like maintained on supporting grids by upper and lower screens, the latter being formed of heavy wire mesh or perforated plate. The water column is disposed beneath the screening element, and the heavier particles, i. e., those having a greater specific gravity, tend to fall through the screening element to the bottom of the tank, being collected in a trough or hutch and removed either continuously or periodically. Also, the divided solids tend to become stratified due to the pulsating movement of the water column, with the heavier particles at the bottom and lighter particles at the top, so that the lighter particles can be overflowed from the jig.

The heavier particles may consist principally of values to be recovered, such as gold or the like, and in some instances, a large proportion of the values in crushed ore, for example, have been recovered in the concentrate produced by such jigging apparatus. The lighter particles, in such instance, comprise gangue or waste from the ore, which is to be discarded.

Among the objects of this invention are to provide an improved jigging apparatus; to provide such apparatus wherein the necessity for creating pulsations of the water in the apparatus may be eliminated; to provide such jigging apparatus in which stratification and separation are improved; to provide such jigging apparatus which is applicable to the treatment of any type of constituents varying in specific gravity; to provide such jigging apparatus adapted to handle relatively dry or wet feed; to provide such jigging apparatus which includes a novel screening element; to provide such jigging apparatus which includes such a screening element of varying separation properties; to provide such jigging apparatus in which selective separation may be varied at different points; to provide such jigging apparatus in which a gaseous or liquid fluid may be utilized to hinder settling; and to provide such jigging apparatus which is relatively simple in construction and efficient in operation. Other objects and the novel features of this invention will become apparent from the following description.

A jigging procedure for separating solids, in accordance with this invention, comprises passing solids downwardly along an inclined foraminous screen device, establishing a body of liquid divided into separate portions having decreasing levels in accordance with the inclination of the screen device, imparting a vibratory movement to the screen device, overflowing liquid and lighter solids from the lower end of the screen device, discharging pulp including settled solids from the lower portions of the body of liquid, and discharging a fluid into the body of liquid to hinder the settling of solid particles through the screen device. The fluid so discharged may be a gaseous fluid, such as air, or a liquid, such as water. In further accordance with this invention, the discharge of fluid into the body of liquid, or separate portions thereof, is regulated in accordance with the desired settling effect in each portion of the body of liquid. Also, when the fluid so discharged is a liquid, a jigging circuit may be established in which the overflow and pulp discharge are treated to separate the liquid from the solids thereof, and the separated liquid is recirculated by discharge into the body of liquid, or portions thereof, to provide hindered settling.

Apparatus particularly adapted to carry out the above method is illustrated in the accompanying drawings, in which.

Figure 1:
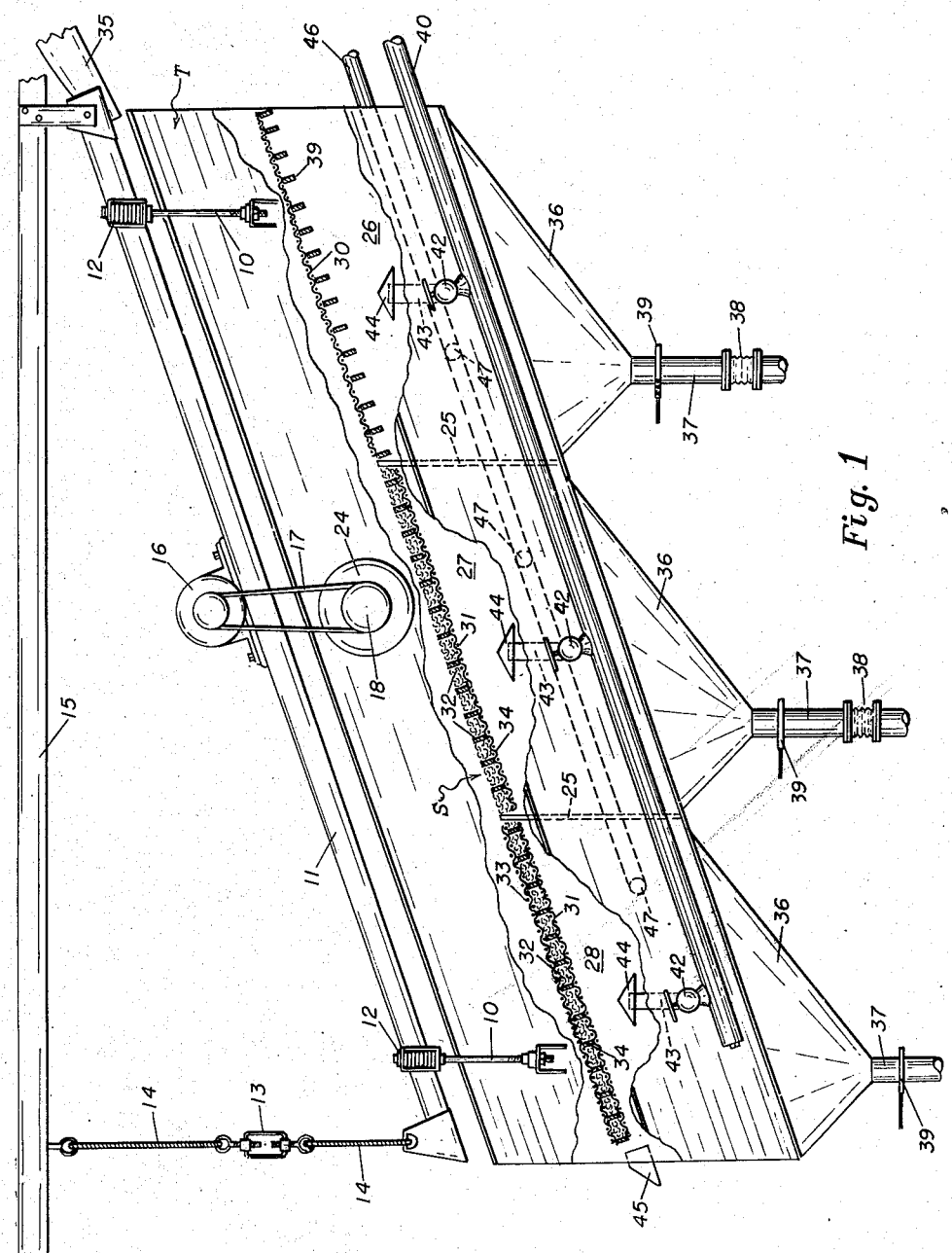
Fig. 1 is a side elevation of jigging apparatus constructed in accordance with this invention, partly broken away to show the interior construction thereof.
Figure 2:
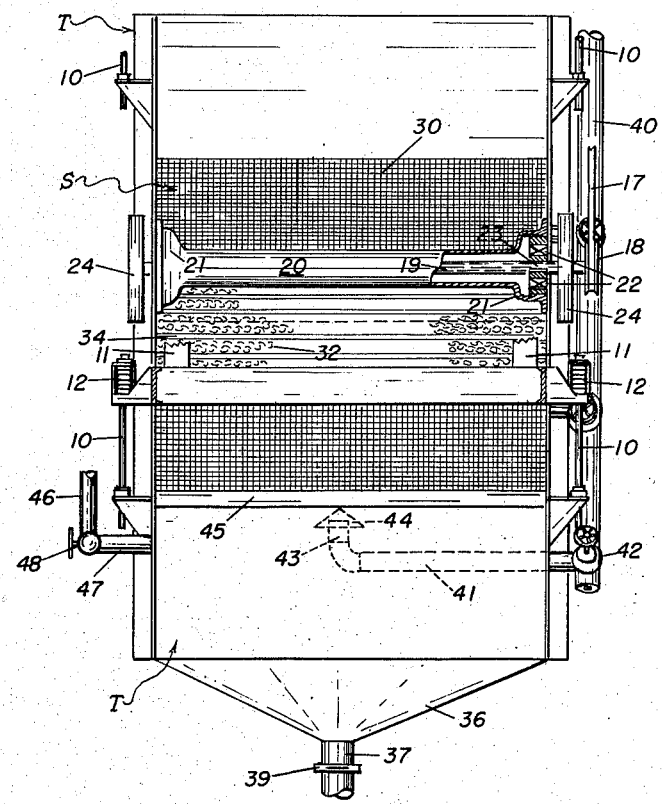
Fig. 2 is an end elevation of the apparatus of Fig. 1, partly in section to show the interior construction.

The jigging apparatus illustrated in Figs. 1 and 2 comprises a tank T, preferably mounted in an inclined position and supported for vibratory movement by rods 10. Rods 10 may be supported in a suitable manner, as from inclined beams 11, a heavy tension spring 12 being provided at the upper end of each rod to absorb vibration and limit transmission thereof to the supporting structure. The angle of inclination and the vertical position of tank T may be regulated by turn buckles 13 disposed between cables 14 adapted to suspend the lower end of each inclined beam 11 from a supporting beam 15, the upper end of each inclined beam being pivoted on supporting beam 15.

For vibrating tank T, a motor 16 may be mounted on a beam 11, and connected by a belt 17 with a pulley 18 mounted on a shaft 19 extending transversely of the tank. As in Fig. 2, shaft 19 extends through a housing 20, the housing having at each end an enlarged section 21 in which suitable bearings, such as roller bearings 22, are mounted. The shaft 19 is provided with a pair of eccentric sections 23 which rotate within the roller bearings and impart the vibratory movement to the tank T. The amplitude of such vibratory movement need not be great, but the period of vibration is preferably relatively fast, such as 1000 to 2000 vibrations per minute.

To prevent undue vibration being transmitted to the supporting structure, the eccentric portions of the shaft are preferably counterbalanced by eccentrically weighted fly wheels 24, one fly wheel being mounted at each end of the shaft. The rim of each fly wheel is thicker at one side than the other to cause the shaft and fly wheels to be both statically and dynamically balanced. The function of the fly wheels thus is two-fold—first, the fly wheels maintain the vibration of the tank and screening element by inertia, thus reducing the power requirements of motor 16; and, second, the fly wheels counterbalance the eccentric portions of the shaft to produce a smooth running machine. Thus, the vibrations of the tank are not sporadic in nature but are relatively smooth and uniform without the transmission of an undue amount of vibration through rods 10 to the supporting structure.

In accordance with this invention, the tank T is provided with an inclined foraminous screen device or element S, preferably divided into two or more sections, such as upper, intermediate, and lower sections, and tank T is divided by partitions 25 into an upper compartment 26, an intermediate compartment 27, and a lower compartment 28, corresponding to the sections of the screening element S. Each of the compartments is filled with liquid, such as water, to a level sufficient to permeate the respective screening element section. Thus, the level of water or liquid in each compartment of the tank is maintained at a different level corresponding to the average height of the screening element section.

The various sections of the screening element may be the same, or differ, in permeability. Thus, the upper section may, as in Fig. 1, consist of a fine screen 30 composed of heavy duty wire mesh; the intermediate and next lower section may consist of a lower screen 31 of heavy mesh beneath a bed 32 of fibrous material such as coco matting or the like; and the lower section may consist of a lower screen 31, a bed 32 of fibrous material, and an upper screen 33 of fine mesh.

In addition to effecting a variation in the permeability of a section of the screening element, the fibrous matting also tends, as in gold ore treating operations, to collect heavy particles, as of gold, which may be removed periodically.

It will be understood, of course, that the entire screening element may be made in the manner of the intermediate or lower sections; or any desired combination of two or more of the sections. To support the screen and matting of the various sections, bars 34 extend transversely of the tank, with the upper screens resting thereon, and the lower screens being attached thereto in a conventional manner.

Divided solids may be fed into the upper end of the tank in a suitable manner, as through an inlet chute 35, and pass downwardly along the screen element. Since the tank and screen element are vibrated in a longitudinal, as well as a vertical direction, the flow of divided solids along such path is assisted. Due to the difference in specific gravity of the constituents of the divided solids, the heavier particles will tend to settle downwardly through the screening element and collect in a hutch 36, or downwardly tapering collecting trough, at the bottom of each compartment, as in Fig. 1. (If desired, the compartments may be rectangularly shaped at the bottom.) Each hutch may be provided with an outlet 37 for discharging the collected settled solids, which will be value-carrying concentrates, in the case of ore-treatment. The collected solids may be discharged continuously, or collected periodically, as desired, a flexible joint 38 being useful for the former purpose, and a shut-off valve 39 for the latter.

To hinder the settling of lighter but larger sized particles, and to improve stratification and separation of the divided solids, a fluid such as air may be supplied by a header 40 and discharged into each compartment through an air inlet 41 controlled by a valve 42. Each air inlet terminates in an upwardly extending pipe 43 provided with a distributing hood 44, or the like. The air from inlets 41 bubbles upwardly in each compartment, and a relatively low pressure of air is preferably utilized. The pressure of air to each compartment may be regulated in accordance with the tendency for material to settle therein. Thus, for the upper compartment, a lower air pressure may be utilized than for the intermediate and lower compartments. However, the air pressure may be regulated in accordance with the permeability of the section of the screening element of the particular compartment, such as a greater air pressure for the upper section than the other sections which include fibrous matting.

The fluid discharged into the tank to hinder settling may be a liquid, such as water, the pressure thereof to the various compartments being regulated in accordance with the desired settling rates and conditions in the various compartments. Such liquid may be discharged into the tank through the same inlets as the air, or through a greater or lesser number of inlets, as desired. Also, different constructions for distributing the liquid in the tank, or compartments thereof, may be utilized, such as nozzles, spray nozzles, pipes having perforations, or the like.

Divided solids, such as waste, which fail to pass through or be retained by the screening element, are contained in a pulp which is discharged from the lower end of the tank over an overflow apron 45, from which the discharge may be carried to waste or subsequent treatment. The jigging apparatus will also handle material either wet or dry, since only a relatively small amount of water is required for wetting dry material sufficiently for successful separation.

When the fluid utilized to hinder settling is air, a water or liquid line 46 may be utilized to supply water to each compartment through inlets 47, the liquid being regulated by valves 48.

Figure 3:
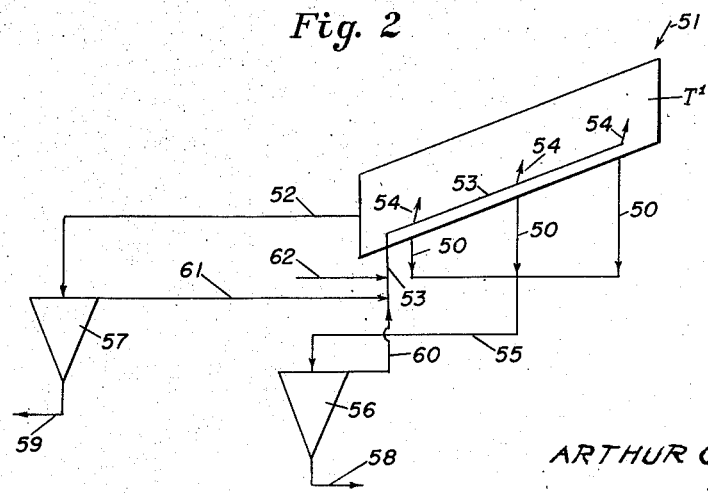
Fig. 3 is a diagrammatic view of jigging and ancillary apparatus, also constructed in accordance with this invention.

In still further accordance with this invention, the jigging apparatus thereof may form the principal element of a jigging circuit, as illustrated in Fig. 3, which includes a tank T'. Tank T' may be divided into several compartments, and may be provided with a screening element having one or more sections, or a unitary screening element, similar to that of the intermediate or lower sections of the screening element S of tank T. Tank T' may also be provided with outlets 50 for collecting the settled solids or concentrates from individual compartments or a single compartment tank, as the case may be; and also may be provided with an inlet 51 and an overflow line 52, along with a fluid header 53 and fluid inlets 54.

In tank T', the fluid discharged for hindering the settling of relatively light particles preferably comprises water or other suitable liquid, and also preferably liquid separated from the pulp discharged as overflow and as concentrates. For this purpose, the pulp discharged through outlets 50 may be combined in a single discharge concentrate line 55, and in the same manner as the discharge from the overflow through line 52, may be passed to suitable separators, such as settling cones 56 and 57, respectively. In settling cone 56, the concentrates are separated from the liquid and passed through a discharge line 58 to a further step in the treatment, or collected for shipment to the smelter. The divided solids separated in settling cone 57 may pass through a line 59 to waste, or to a flotation machine or the like, or to any other further step in the treatment. The liquid separated in settling cones 56 and 57 is conveyed through pipes 60 and 61, respectively, to header 53 for recirculation to the tank T'. As will be evident, settling cones 56 and 57 are adapted to separate water for recirculation back to the tank T', and as also will be evident, the feed of water into tank T' is substantially uniform and does not approximate the pulsations imparted to the water by reciprocating diaphragms of previous types of jigs. If additional water is necessary for make-up, it may be added to the water in tank T' by a separate pipe, or by a make-up feed line 62 connected to header 53. The discharge of liquid into the compartments may also be regulated to maintain the liquid in the compartments at the desired levels. Also, suitable pumps, or the like, may be provided for producing the desired circulation of pulp and liquid, as in lines 51, 52, 58 and 59.

From the foregoing, it will be evident that the apparatus of this invention operates efficiently and effectively to carry out the procedure of this invention and that the principles thereof may be applied to the treatment of a wide variety of materials. The inclination of the tank and screen elements may be varied as desired, as well as the pressure of air or other fluid in the various compartments for hindering the settlement of lighter particles. In addition, the various combinations of screening elements that may be employed is numerous, and all of these factors permit successful adaptation of the apparatus to many different types of material.

It will be understood that apparatus other than that described may be used in carrying out the present invention; that various changes may be made in the apparatus, not only in carrying out the invention but in providing other apparatus which operates in substantially the same manner to produce substantially the same result; that various changes may be made in the operation and the parts of the apparatus of this invention; and that additional changes may be made, in addition to those indicated, without departing from the spirit and scope of this invention.

What is claimed is:

Jigging apparatus comprising a tank adapted to contain liquid; inclined foraminous means through which heavier particles tend to settle and having an upper section formed by a metal screen having a plurality of substantially uniform apertures, an intermediate section formed by a metal screen supporting a layer of fiber matting, and a lower section formed by a metal screen supporting and a metal screen above a layer of fiber matting; an inlet for feeding divided solids to the upper end of said tank; an outlet for overflowing liquid and lighter solids at the lower end of said tank; means for removing settled solids from beneath said foraminous means; and means for producing a vibratory movement of said tank.

ARTHUR C. DAMAN.

REFERENCES CITED

The following references are of record in the file of this patent:

UNITED STATES PATENTS

| Number | Name | Date |
|---|---|---|
| Re. 21,682 | Stump | Dec. 31, 1940 |
| 351,057 | Litchfield | Oct. 19, 1886 |
| 395,625 | Moore | Jan. 1, 1889 |
| 1,054,799 | Skinner | Mar. 4, 1913 |
| 1,106,923 | Burnhart | Aug. 11, 1914 |
| 1,590,339 | Wood | June 29, 1926 |
| 1,794,075 | Hesse | Feb. 24, 1931 |
| 2,238,338 | Moir | Apr. 15, 1941 |
| 2,301,937 | Fahrenwald | Nov. 17, 1942 |

FOREIGN PATENTS

| Number | Country | Date |
|---|---|---|
| 148,168 | Great Britain | Mar. 10, 1921 |
| 253,139 | Great Britain | Aug. 18, 1927 |
| 528,091 | France | Aug. 9, 1921 |